United States Patent
Bisping et al.

(10) Patent No.: US 6,726,361 B2
(45) Date of Patent: Apr. 27, 2004

(54) ARRANGEMENT FOR MEASURING THE TEMPERATURE OF AN ELECTRONIC CIRCUIT

(75) Inventors: Michael Bisping, Hamburg (DE); Hermann Jabs, Hamburg (DE); Juergen Marschner, Bremen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/191,399

(22) Filed: Jul. 9, 2002

(65) Prior Publication Data

US 2003/0053517 A1 Mar. 20, 2003

(30) Foreign Application Priority Data

Jul. 11, 2001 (DE) ......................................... 101 33 736

(51) Int. Cl.[7] ............................ G01K 7/01; H01L 31/06
(52) U.S. Cl. ........................................ 374/178; 257/470
(58) Field of Search ............................... 374/178, 141, 374/152, 163; 257/470, 467; 327/512

(56) References Cited

U.S. PATENT DOCUMENTS

| | | | | |
|---|---|---|---|---|
| 4,197,442 A | * | 4/1980 | Carlsson et al. ............ | 219/716 |
| 4,854,731 A | * | 8/1989 | Jenkins ........................ | 374/178 |
| 5,070,322 A | * | 12/1991 | Fujihira ....................... | 340/653 |
| 5,213,416 A | * | 5/1993 | Neely et al. ................. | 374/178 |
| 5,349,336 A | * | 9/1994 | Nishiura et al. ............. | 374/178 |
| 5,376,819 A | * | 12/1994 | Gay et al. .................... | 257/467 |
| 5,639,163 A | * | 6/1997 | Davidson et al. ........... | 374/178 |
| 5,918,982 A | * | 7/1999 | Nagata et al. ............... | 374/178 |
| 5,961,215 A | * | 10/1999 | Lee et al. ..................... | 374/178 |
| 5,982,221 A | * | 11/1999 | Tuthill ......................... | 327/512 |
| 6,008,685 A | * | 12/1999 | Kunst .......................... | 327/512 |
| 6,019,508 A | * | 2/2000 | Lien ............................. | 374/178 |
| 6,149,299 A | * | 11/2000 | Aslan et al. .................. | 374/178 |
| 6,612,738 B2 | * | 9/2003 | Beer et al. ................... | 374/183 |

FOREIGN PATENT DOCUMENTS

| | | | | |
|---|---|---|---|---|
| EP | 0360333 A2 | * | 3/1990 | ................. 374/178 |
| JP | 05235253 A | * | 9/1993 | ........... H01L/23/58 |

OTHER PUBLICATIONS

M. Holdaway; "Factors Affecting Accuracy in Silicon Digital Temperature Sensors" Electronic Engineering, Morgan–Grampian Ltd. London, GB, BD. 72. NR 876, Jan. 2000, Seiten 26–27, 29–30, XP000945903.

* cited by examiner

Primary Examiner—Christopher W. Fulton
Assistant Examiner—Mirellys Jagan
(74) Attorney, Agent, or Firm—Michael J. Ure

(57) ABSTRACT

An arrangement for measuring the temperature of an electronic circuit, the arrangement comprising a measuring element being in close thermal communication with the electronic circuit, which measuring element comprises a temperature-dependent component in each one of at least two current paths and whose current-voltage characteristic is dependent on the temperature in accordance with a different predetermined function in at least two of the current paths, which temperature-dependent components can each be impressed with a predetermined current for generating a voltage dependent on the temperature at each one of the temperature-dependent components, and an evaluation circuit for forming an output voltage representing a measure of the temperature of the electronic circuit from the difference of the voltages at the temperature-dependent components.

By measuring the output voltage of the arrangement according to the invention, it is possible to measure the instantaneous temperature of the semiconductor body in a simple, rapid and accurate manner. The measured value of the temperature may be directly evaluated by means of an electronic signal processing operation, for example, in an apparatus for performing the pre-measurement.

11 Claims, 1 Drawing Sheet

ARRANGEMENT FOR MEASURING THE TEMPERATURE OF AN ELECTRONIC CIRCUIT

FIELD OF THE INVENTION

The invention relates to an arrangement for measuring the temperature of an electronic circuit.

BACKGROUND OF THE INVENTION

In the manufacture of semiconductor circuits, particularly monolithically integrated semiconductor circuits, a test, denoted as pre-measurement, is usually performed after finishing the conductor structures on the semiconductor body and before incorporating the semiconductor body in a housing, so as to reject defective circuits before they are incorporated in the housing. Moreover, a classification or specification of the semiconductor circuits based on their operating data can be performed with this pre-measurement. A condition for a correct pre-measurement is the knowledge of the instantaneous temperature of the semiconductor body, because many measuring values are temperature-dependent.

SUMMARY OF THE INVENTION

It is an object of the invention to provide an arrangement with which a measurement of the instantaneous temperature of the semiconductor body is possible in a simple, rapid and accurate manner.

According to the invention, this object is achieved by an arrangement for measuring the temperature of an electronic circuit, the arrangement comprising
  a measuring element being in close thermal communication with the electronic circuit, which measuring element comprises a temperature-dependent component in each one of at least two current paths and whose current-voltage characteristic is dependent on the temperature in accordance with a different predetermined function in at least two of the current paths, which temperature-dependent components can each be impressed with a predetermined current for generating a voltage dependent on the temperature at each one of the temperature-dependent components, and
  an evaluation circuit for forming an output voltage representing a measure of the temperature of the electronic circuit from the difference of the voltages at the temperature-dependent components.

By measuring the output voltage of the arrangement according to the invention, it is possible to measure the instantaneous temperature of the semiconductor body in a simple, rapid and accurate manner. The measured value of the temperature may be directly evaluated by means of an electronic signal processing operation, for example, in an apparatus for performing the pre-measurement.

Moreover, the arrangement according to the invention may also be used in the specifically defined operation of the electronic circuit for a continuous temperature observation. Measures for protecting the electronic circuit, for example, from overheating can then be taken in a very simple manner.

The temperature-dependent components are preferably formed with semiconductor diodes. These semiconductor diodes have a simple structure and can be provided in an electronic circuit without any additional manufacturing steps. Their temperature dependence is satisfactorily reproducible.

Particularly, the semiconductor diodes arranged in the different current paths are formed with different surfaces of their semiconductor junctions. This provides the easy possibility of manufacturing them in accordance with different predetermined functions of the temperature-dependent components without changing manufacturing parameters, for example, in the diffusion of the conductor structures of the semiconductor body of the electronic circuit.

In accordance with a further embodiment of the arrangement according to the invention, the temperature-dependent components are interconnected by way of a respective first one of their terminals, and their respective second terminals are connected to a device for impressing at least substantially identical currents. In accordance with the different temperature dependencies of the current voltage characteristics of the temperature-dependent components, different temperature-dependent voltages are generated at the temperature-dependent components, which voltage differences can be measured and evaluated easily and accurately.

Advantageously, the device for impressing at least substantially identical currents comprises a current mirror arrangement with which corresponding currents can be generated and supplied easily and accurately.

Advantageously, the interconnected first terminals of the temperature-dependent components are preferably coupled to a device for supplying a reference voltage. The measurement of the temperature-dependent voltages at the individual temperature-dependent components is performed with respect to this reference voltage. In particular, the reference voltage does not correspond to a ground potential provided by the electronic circuit at, for example, a ground conductor system in the electronic circuit, but the reference voltage is rather generated in a preferably separate temperature-stable manner. In accordance with an advantageous further embodiment of the invention, this can be achieved in that the device for supplying a reference voltage is formed with a bandgap reference from which the reference voltage is derived. By utilizing the reference voltage generated in a separate temperature-stable manner instead of the ground potential, inaccuracies in the temperature measurement, as may occur due to local fluctuations of the ground conductor system in the electronic circuit, are eliminated.

In a further embodiment of the invention, the evaluation circuit comprises
  at least an inverter stage for inverting at least one of the temperature-dependent voltages at at least one of the temperature-dependent components,
  at least a voltage combination stage for forming a voltage value which corresponds to the arithmetic mean value of at least one of the temperature-dependent voltages at at least one of the temperature-dependent components and at least one of the inverted temperature-dependent voltages at at least a further one of the temperature-dependent components, and
  an output amplifier stage for amplifying and supplying the voltage value formed by the voltage combination stage as an output voltage representing a measure of the temperature of the electronic circuit.

This embodiment of the evaluation stage provides the possibility of determining the output voltage representing a measure of the temperature of the electronic circuit independently of indirect values such as the reference voltage and only by the dimensioning of the arrangement according to the invention.

In a further embodiment of the arrangement according to the invention described hereinbefore, in which the interconnected first terminals of the temperature-dependent components are coupled to a device for supplying a reference voltage, the evaluation circuit receives the same reference voltage for fixing its working point as the interconnected first terminals of the temperature-dependent components. This additionally enhances the accuracy of the temperature measurement. Moreover, the use of the internally generated reference voltage has the result that the components comprised by the arrangement according to the invention can be operated at optimal working points. As a result, the arrangement according to the invention operates to a very linear extent over a large temperature range.

In a further embodiment of the arrangement according to the invention described hereinbefore, the electronic circuit, whose temperature is to be measured, is constituted as a monolithically integrated semiconductor circuit, the measuring element and the evaluation circuit are combined with the electronic circuit constituted as a monolithically integrated semiconductor circuit on a semiconductor body, and the electronic circuit constituted as a monolithically integrated semiconductor circuit comprises contacts for supplying and/or draining electric voltages and/or currents to and from the electronic circuit for supplying and draining power supply energy and/or signals, respectively, wherein at least a first of these contacts is adapted to provide an output voltage of the evaluation circuit representing a measure of the temperature of the electronic circuit, and at least a second contact provides the reference voltage applied to the temperature-dependent components at their interconnected first terminals as well as to the evaluation circuit for fixing its working point.

In this embodiment, the arrangement according to the invention is easily and directly usable for determining the temperature of the electronic circuit and for evaluating the measuring value of the temperature also outside the electronic circuit, for example, during a test of this circuit in a manufacturing process.

These and other aspects of the invention are apparent from and will be elucidated with reference to the embodiments described hereinafter.

DETAILED DESCRIPTION OF THE INVENTION

Figure 1:
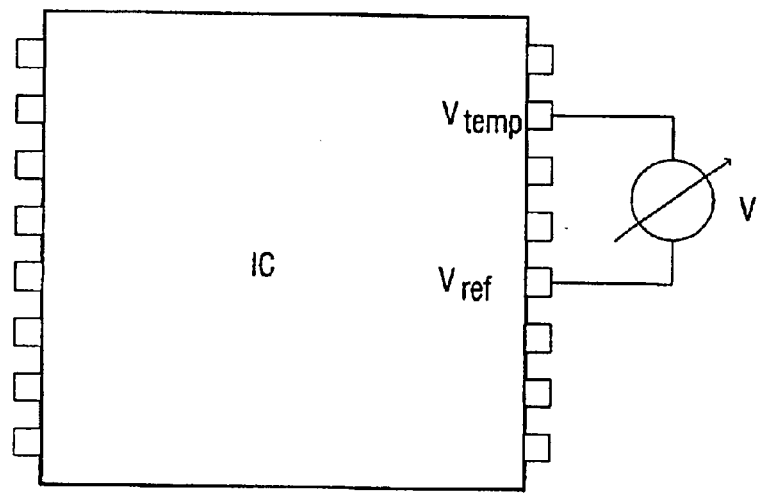
FIG. 1 is a block diagram showing the measurement of the temperature of a monolithically integrated electronic circuit formed with an arrangement according to the invention.

In FIG. 1, the reference IC denotes a monolithically integrated electronic circuit which is diagrammatically shown in a rectangular form with contact rows arranged on the sides symbolized in FIG. 1 by boundary lines shown in a perpendicular alignment. These contacts are used in the electronic circuit for supplying and/or draining electric voltages and/or currents to and from the electronic circuit for supplying or draining power supply energy and/or signals. An arrangement in accordance with, for example, FIG. 2 and described with reference to this Figure supplies an output voltage $V_{temp}$ representing a measure of the temperature of the electronic circuit IC at a first of these contacts which is selected in FIG. 1, for example, as the second from the top in the contact row shown on the right-hand side of the electronic circuit IC. The same arrangement also supplies a temperature-constant reference voltage $V_{ref}$ generated in the arrangement at a second contact which is selected in FIG. 1, for example, as the fifth one from the top in the contact row shown on the right-hand side of the electronic circuit IC. By simple voltage measurement, the difference between the output voltage $V_{temp}$ representing a measure of the temperature of the electronic circuit IC and the reference voltage $V_{ref}$ is determined.

The temperature of the electronic circuit IC is defined by the following $$T = \frac{V_{temp} - V_{ref}}{a}, \quad [1]$$

wherein T is the absolute temperature of the electronic circuit IC and a is a constant.

To determine the constant a, the following considerations are made hereinafter with reference to FIG. 2.

The measurement of the voltage difference between the output voltage $V_{temp}$ and the reference voltage $V_{ref}$ by means of a voltmeter thus provides the possibility, after solving the linear equation [1], of rapidly and easily determining the instantaneous temperature T of the electronic circuit IC.

Figure 2:
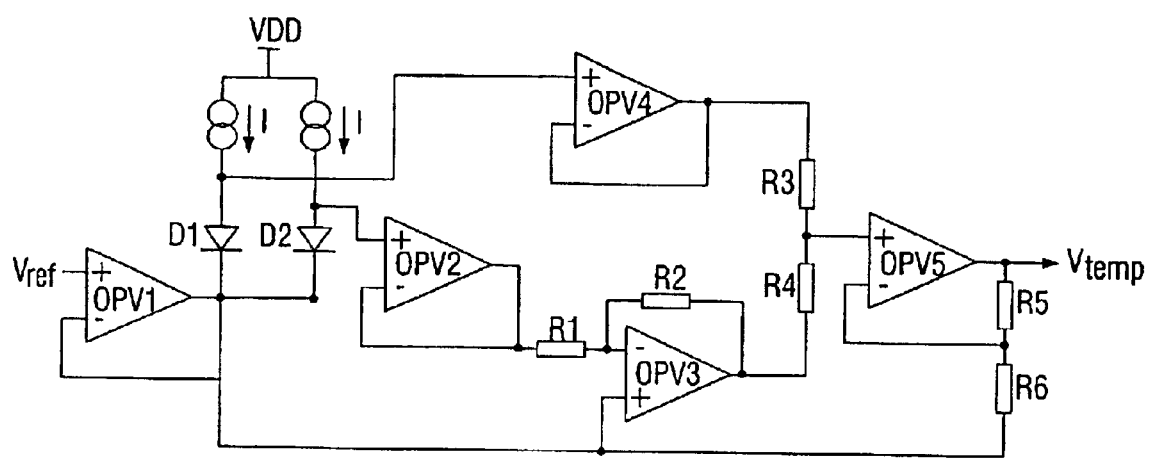
FIG. 2 shows an example of an embodiment of an arrangement according to the invention.

FIG. 2 shows an example of an arrangement with which the above-mentioned output voltage $V_{temp}$ and the reference voltage $V_{ref}$ are generated. The principle of the measuring method used in this respect will hereinafter be briefly elucidated before describing the components of the arrangement shown in FIG. 2.

To be able to measure the temperature T, components are required whose electrical properties change with this temperature T. An electronic component which has this property is the diode. The operating behavior of a diode in the forward range for currents which are large with respect to their reverse saturation current can be defined by the following equations:

$$I = I_S \cdot e^{\frac{V_D}{V_T}} \quad [2]$$

$$V_T = \frac{k \cdot T}{q}$$

In this equation,

I is the current intensity of the current through the diode, $I_S$ is the reverse saturation current of the diode, $V_D$ is the diode voltage measured in the forward direction of the diode, $V_T$ is the temperature voltage, $k=1,38*10^{-23}$ J/K is the Boltzmann constant and $q=1,6*10^{-19}$ C is the elementary charge.

When the above-mentioned diode equation [2] is converted to the diode voltage $V_D$, the following equation is obtained:

$$V_D = V_T \cdot \ln\left(\frac{I}{I_S}\right) \quad [3]$$

Since the reverse saturation current $I_S$ of a semiconductor diode is proportional to the surface of its (P-N) junction, the relations $$V_{D1} = V_T \cdot \ln\left(\frac{I}{I_{S1}}\right) \qquad [4]$$

$$V_{D2} = V_T \cdot \ln\left(\frac{I}{I_{S2}}\right)$$

are obtained from equation [3] for two diodes D1 and D2 with different surfaces.
In this equation,
- $I_{S1}$ is the reverse saturation current of diode D1,
- $I_{S2}$ is the reverse saturation current of diode D2,
- $V_{D1}$ is the diode voltage of diode D1, measured in the forward direction,
- $V_{D2}$ is the diode voltage of diode D2, measured in the forward direction.

In the practical embodiment of a monolithically integrated circuit, different diode surfaces are often obtained by parallel arrangement of a corresponding multitude of identical diode in conformity with the desired surface factor, i.e. the mutual ratio of the diode surfaces.

In the case considered, the reverse saturation currents of the diodes D1 and D2 can be determined by means of the equations $$I_{S1} = I_S \qquad [5]$$
$$I_{S2} = x \cdot I_S$$

in which
x is the surface factor, i.e. the mutual surface ratio of the diodes D1 and D2.

When a (second) diode compared with a (first) diode with a predetermined surface has a surface factor x which is obtained, for example, in that the (second) diode consists of a diode field of x parallel arranged (first) diodes with said, predetermined surface, the diode voltage $V_T$ will change accordingly with respect to that of the (first) diode with the predetermined surface when this (second) diode having the surface factor x is impressed with an unchanged current I. When these identical currents are supplied in the above-mentioned dimensioning of the diodes D1 and D2, the following difference $\Delta V$ in the diode voltages is obtained:

$$\Delta V = V_{D1} - V_{D2} \qquad [6]$$

$$= V_T \cdot \left(\ln\frac{I}{I_{S1}} - \ln\frac{I}{I_{S2}}\right) = V_T \cdot \left(\ln\frac{I}{I_S} - \ln\frac{I}{x \cdot I_S}\right)$$

$$= V_T \cdot \ln x = T \cdot \underbrace{\frac{k}{q}}_{konst} \ln x$$

When, as shown in FIG. 2 at the diodes D1 and D2 in this Figure, two such dimensioned diodes are connected together by way of their cathodes, the difference $\Delta V$ in the diode voltages can be directly taken as a voltage difference from the anodes of the diodes.

The voltage difference $\Delta V$ between the diodes D1 and D2 described hereinbefore (for example, diodes D1 and D2 in FIG. 2) is dependent on the surface factor x and the temperature voltage $V_T$ which, as is evident from equation [2], is directly proportional to the absolute temperature T. The voltage difference $\Delta V$ is thus also directly proportional to the absolute temperature T.

The arrangement shown in FIG. 2 utilizes this temperature dependence and provides the possibility of determining the absolute temperature of the electronic circuit IC via an external voltage measurement in a simple and accurate manner.

In the arrangement shown in FIG. 2, the references D1 and D2 denote a first and a second semiconductor diode dimensioned in accordance with the implementations described hereinbefore, which diodes have their cathodes connected together and to an output and an inverting input (−) of a first operational amplifier OPV1. Each diode D1 and D2 constitutes a temperature-dependent component of a measuring element and is inserted in one of two current paths by way of a connection of their anodes to a respective current source. The current sources are preferably constituted by two commonly controlled output branches of a current mirror arrangement. The diodes D1 and D2 are impressed as temperature-dependent components with a current I which is predetermined in the relevant current path by the associated current source. Consequently, a temperature-dependent voltage is generated at the anodes of the diodes D1 and D2. To detect the temperature of the electronic circuit IC (not shown in FIG. 2) with this measuring element, it is in close thermal communication with this electronic circuit IC. The arrangement shown in FIG. 2 is preferably monolithically integrated with the electronic circuit IC on a common semiconductor body. Moreover, other thermal connections are possible, for example, adhesive or soldered joints with which the plurality of semiconductor bodies may be combined to a compact assembly.

The current paths formed from the diodes D1 and D2 and their series-arranged current sources in the arrangement of FIG. 2 are arranged parallel to each other between a power supply terminal VDD and the junction point of the cathodes of the diodes D1, D2. The anode of the second diode D2 is further connected to a non-inverting input (+) of a second operational amplifier OPV2. An output and an inverting input (−) of the second operational amplifier OPV2 are connected to a first terminal of a first ohmic resistor R1. In this way, the second operational amplifier OPV2 constitutes a voltage follower by which the potential VD2 from the anode of the second diode D2 is low-ohmic supplied to the first terminal of the first ohmic resistor R1.

In a corresponding way, the anode of the first diode D1 is connected to a non-inverting input (+) of a fourth operational amplifier OPV4. An output and an inverting input (−) of the fourth operational amplifier OPV4 are interconnected. In this way, the fourth operational amplifier OPV4 also constitutes a voltage follower by which the potential VD1 is low-ohmic supplied by the anode of the first diode D1.

Also the first operational amplifier OPV1 is arranged as a voltage follower. Its non-inverting input (+) receives the reference voltage $V_{ref}$ which is preferably derived from a bandgap reference and is therefore very temperature-stable. This reference voltage $V_{ref}$ is thus available with a low resistance at the cathode junction of the diodes D1, D2. It is also applied to the contact of the electronic circuit IC, which contact is indicated in a corresponding manner in FIG. 1.

For further processing, the potentials of the anodes of the diodes D1, D2 and the reference voltage $V_{ref}$ are available with a low resistance in the arrangement described with reference to FIG. 2.

A second terminal of the first ohmic resistor R1 is connected to a first terminal of a second ohmic resistor R2 and an inverting input of a third operational amplifier OPV3. A second terminal of the second ohmic resistor R2 is connected to an output of the third operational amplifier OPV3. A non-inverting input (+) of the third operational amplifier OPV3 is connected to the output of the first operational amplifier OPV1. The third operational amplifier OPV3 operates as an inverting voltage amplifier whose voltage amplification is determined by the resistance ratio of the first and second ohmic resistors R1, R2. The reference voltage $V_{ref}$ is used as a reference potential for this voltage amplifier.

The output of the fourth operational amplifier OPV4 is connected to a first terminal of a third ohmic resistor R3. The output of the third operational amplifier OPV3 is connected to a first terminal of a fourth ohmic resistor R4. The third and fourth ohmic resistors R3, R4 are connected together by way of their second terminals and to a non-inverting input (+) of a fifth operational amplifier OPV5.

Via the third and fourth ohmic resistors R3 and R4, the voltages from the outputs of the third and fourth operational amplifiers OPV3 and OPV4 are combined at the junction point of the second terminals of the third and fourth ohmic resistors R3, R4. The third and fourth ohmic resistors R3, R4 thus constitute a voltage combination stage for forming a voltage value which corresponds to the arithmetic mean value weighted by means of the resistances of the third and the fourth ohmic resistors R3, R4 of the temperature-dependent voltage $V_{D1}$ at the first temperature-dependent component, the first diode D1, and the temperature-dependent voltage $V_{D2}$, inverted by means of the voltage amplification of the third operational amplifier OPV3, at the second temperature-dependent component, the second diode D2.

The fifth operational amplifier OPV5 operates as a non-inverting amplifier at the reference voltage $V_{ref}$. To this end, an output of the fifth operational amplifier OPV5 is connected to a first terminal of a fifth ohmic resistor R5. The fifth ohmic resistor R5 constitutes a series arrangement with a sixth ohmic resistor R6, one end point of which is formed from the first terminal of the fifth ohmic resistor R5 and the second end point of which is formed from a first terminal of the sixth ohmic resistor R6. This second end point is connected to the output of the first operational amplifier OPV1 and thus receives the reference voltage $V_{ref}$. Via a connection of their second terminals, the fifth ohmic resistor R5 and the sixth ohmic resistor R6 constitute the series arrangement; this connection is also combined with an inverting input (−) of the fifth operational amplifier OPV5. The amplification of the fifth operational amplifier OPV5 results from the resistances of the fifth and sixth ohmic resistors R5 and R6. The output voltage $V_{temp}$ representing a measure of the temperature T of the electronic circuit IC is provided at the output of the fifth operational amplifier OPV5.

In combination with the above-mentioned equations [1] to [6], which also apply to the diodes D1 and D2 constituting the measuring element, the factor a presented in equation [1] can now be computed for the arrangement shown in FIG. 2. Furthermore, it can be assumed in a satisfactory approximation that the voltages at the outputs of the voltage followers OPV2 and OPV4 correspond to the voltages at their respective (non-inverting (+)) inputs. While considering the circuitry of the third operational amplifier OPV3, the equation $$V_{D2'} = -\frac{R_2}{R_1}[V_{D2} - V_{ref}] + V_{ref}, \quad [7]$$

is obtained, wherein $R_1$ is the resistance of the first ohmic resistor R1,
$R_2$ is the resistance of the second ohmic resistor R2, and
$V_{D2'}$ is the potential at the output of the third operational amplifier OPV3.

Via the third and fourth ohmic resistors R3 and R4, the voltages $V_{D1}$ and $V_{D2}$ are combined at the junction point of these resistors and hence at the non-inverting input (+) of the fifth operational amplifier OPV5. The following voltage $V_X$, corresponding to the ratio between the resistances of these resistors R3 and R4, is obtained at the non-inverting input (+) of the fifth operational amplifier OPV5:

$$V_X = \frac{R_4}{R_3 + R_4}(V_{D1} - V_{D2'}) + V_{D2'}, \quad [8]$$

in which $R_3$ is the resistance of the third ohmic resistor R3 and
$R_4$ is the resistance of the fourth ohmic resistor R4.

The fifth operational amplifier OPV5 operates as a non-inverting amplifier at the reference voltage $V_{ref}$. The amplification is obtained from the resistors R5 and R6. The fifth operational amplifier OPV5 provides, at its output, the output voltage $V_{temp}$ which is a measure of the temperature T of the electronic circuit IC, which voltage is computed from the following equation:

$$V_{temp} = (V_X - V_{ref})\frac{R_5 + R_6}{R_6} + V_{ref}, \quad [9]$$

in which $R_5$ is the resistance of the fifth ohmic resistor R5 and
$R_6$ is the resistance of the sixth ohmic resistor R6.

When equations [7] and [8] are used in equation [9], the following relation is obtained for the output voltage $V_{temp}$ representing a measure of the temperature T of the electronic circuit IC:

$$V_{temp} = \left[\frac{R_4}{R_3 + R_4} \cdot V_{D1} + \left(1 - \frac{R_4}{R_3 + R_4}\right) \cdot \left(-\frac{R_2}{R_1}(V_{D2} - V_{ref}) + V_{ref}\right) - V_{ref}\right] \cdot \frac{R_5 + R_6}{R_6} + V_{ref} \quad [10]$$

For an effective dimensioning of the described embodiment of the arrangement according to the invention, the resistances of the first and second ohmic resistors R1, R2 are chosen to be equally large. Since the third operational amplifier OPV3 is arranged as an inverting voltage amplifier, a voltage amplification of $$A_V = -1$$

is obtained.

The resistors R3 and R4 determine the voltage $V_X$ at the junction point of the second terminals of the third and fourth ohmic resistors R3, R4 and the non-inverting input (+) of the fifth operational amplifier OPV5. The non-inverting input (+) of the fifth operational amplifier OPV5 should receive the arithmetic mean value of the voltages $V_{D1}$ and $V_{D2}$. The resistances of the third and fourth ohmic resistors R3 and R4 should therefore be chosen to be equally large. With $$R_1 = R_2 \text{ and } R_3 = R_4$$

equation [10] is simplified as follows:

$$V_{temp} = \frac{1}{2} \cdot \frac{R_5 + R_6}{R_6}[V_{D1} - V_{D2}] + V_{ref}. \quad [11]$$

When, finally, the differences between the voltages at the anodes of the diodes D1 and D2 is replaced by equation [6], the following equation is obtained for the output voltage $V_{temp}$ representing a measure of the temperature T of the electronic circuit IC:

$$V_{temp} = \underbrace{\frac{k \cdot \ln x}{2q} \frac{R_5 + R_6}{R_6}}_{a} \cdot T + V_{ref}. \quad [12]$$

The factor combined to a in the above-mentioned equation [12] is constant via the temperature T and only dependent on the dimensioning of the circuit. As is also clear from equation [1], the factor a determines the slope of the temperature curve. The resistors R5, R6 are dimensioned in such a way that an adequate amplification is obtained. The output voltage $V_{temp}$ representing a measure of the temperature T of the electronic circuit IC thus increases linearly with the absolute temperature T. The output voltage $V_{temp}$ consists of the addition of the temperature-dependent part and the reference voltage $V_{ref}$ which is derived within the arrangement according to the invention or the electronic circuit IC, for example, from the bandgap voltage of a bandgap reference. When this reference voltage $V_{ref}$ is available at an external contact of the electronic circuit IC, as is indicated in FIG. 1, the temperature-dependent part (of the potential) of the output voltage $V_{temp}$ can be directly measured by measuring the potential difference between (the potential of) the output voltage $V_{temp}$ and (the potential of) the reference voltage $V_{ref}$. If the slope of $V_{temp}$ is known, the absolute temperature T of the electronic circuit IC can thus be determined in a simple and accurate manner.

The invention thus provides a simple and precise measurement of the temperature of an electronic circuit, both during its manufacture and during its operation-defined use. As far as its accuracy is concerned, the arrangement according to the invention is only dependent on the spread of a small part of the components used and is therefore insensitive to manufacturing spreads and disturbances which relate to, for example, the reference voltage, or to disturbing effects on the power supply voltage or ground connections of the electronic circuit. By targeted use of the internal reference voltage $V_{ref}$ instead of a ground potential occurring in the electronic circuit or the arrangement according to the invention, inaccuracies caused by local fluctuations are eliminated.

The arrangement according to the invention is preferably completely integrated with the electronic circuit whose temperature is to be measured.

The inverter stage formed by the third operational amplifier OPV3 in the shown embodiment of the arrangement has a particular significance. By inverting the voltage $V_{D2}$ at the anode of the second diode D2 with respect to the reference voltage $V_{ref}$, the sum of the two potentials $V_{D1}$ and $V_{D2}$ at the anodes of the first and second diodes D1, D2 occurs at the series arrangement of the third and fourth ohmic resistors R3 and R4. It is thereby additionally achieved that the reference voltage $V_{ref}$ at the output of the fifth operational amplifier OPV5 is only taken along as an additive value, as is evident from equation [12]. This reference voltage $V_{ref}$ can be subtracted by measurement of the voltage difference, as is indicated in FIG. 1.

The use of an internal reference voltage also has the effect that the components used in the arrangement according to the invention are operated at optimal working points. As a result, the arrangement according to the invention operates to a very linear extent over a large temperature range. In a dimensioning example, a range between −40° C. and +125° C. can be easily achieved. This is significant for the specification of the electronic circuits to be measured.

What is claimed is:

1. An arrangement for measuring the temperature of an electronic circuit, the arrangement comprising
   a measuring element being in close thermal communication with the electronic circuit, which measuring element comprises a temperature-dependent component in each of a plurality of current paths and whose current-voltage characteristic is dependent on the temperature in accordance with a different predetermined function in the plurality of current paths, which temperature-dependent components can each be impressed with a predetermined current for generating a voltage dependent on the temperature at each one of the temperature-dependent components, and
   an evaluation circuit for forming an output voltage representing a measure of the temperature of the electronic circuit from the difference of the voltages at the temperature-dependent components, the evaluation circuit comprising an inverter stage for inverting one of the temperature-dependent voltages at one of the temperature-dependent components, a voltage combination stage for forming a voltage value which corresponds to the arithmetic mean value of one of the temperature-dependent voltages at one of the temperature-dependent components and the inverted temperature-dependent voltages, and an output amplifier stage for amplifying and supplying the voltage value formed by the voltage combination stage as an output voltage representing a measure of the temperature of the electronic circuit.

2. An arrangement as claimed in claim 1, characterized in that the temperature-dependent components are formed with semiconductor diodes.

3. An arrangement as claimed in claim 2, characterized in that the semiconductor diodes arranged in the different current paths are formed with different surfaces of their semiconductor junctions.

4. An arrangement as claimed in claim 1, characterized in that the temperature-dependent components each have first and second terminals, wherein the components are interconnected by way of a respective first one of their terminals, and their respective second terminals are connected to a device for impressing at least substantially identical currents.

5. An arrangement as claimed in claim 4, characterized in that the device for impressing at least substantially identical currents comprises a current mirror arrangement.

6. An arrangement as claimed in claim 4, characterized in that the interconnected first terminals of the temperature-dependent components are coupled to a device for supplying a reference voltage.

7. An arrangement as claimed in claim 6, characterized in that the device for supplying a reference voltage is formed with a bandgap reference from which the reference voltage is derived.

8. An arrangement as claimed in claim 4, in which the interconnected first terminals of the temperature-dependent components are coupled to a device for supplying a reference voltage, characterized in that the evaluation circuit receives the same reference voltage for fixing its working point as the interconnected first terminals of the temperature dependent components.

9. An arrangement as claimed in claim 8, characterized in that
   the electronic circuit, whose temperature is to be measured, is constituted as a monolithically integrated semiconductor circuit,
   the measuring element and the evaluation circuit are combined with the electronic circuit constituted as a monolithically integrated semiconductor circuit on a semiconductor body, and in that the electronic circuit constituted as a monolithically integrated semiconductor circuit comprises contacts for supplying and/or draining electric voltages and/or currents to and from the electronic circuit for supplying and draining power supply energy and/or signals, respectively, wherein at least a first of these contacts is adapted to provide an output voltage of the evaluation circuit representing a measure of the temperature of the electronic circuit, and at least a second contact provides the reference voltage applied to the temperature-dependent components at their interconnected first terminals as well as to the evaluation circuit for fixing its working point.

10. An arrangement as claimed in claim 9, adapted to provide an output voltage of the evaluation circuit representing a measure of the temperature of the electronic circuit during a test of the electronic circuit at its manufacture.

11. A semiconductor product comprising an arrangement as claimed in claim 1.

* * * * *